United States Patent
Qvart

[11] Patent Number: 5,395,186
[45] Date of Patent: Mar. 7, 1995

[54] MILLING CUTTER HAVING INSERT-CARRYING CARTRIDGES

[75] Inventor: Ingemar Qvart, Valbo, Sweden

[73] Assignee: Sandvik AB, Sandviken, Sweden

[21] Appl. No.: 992,106

[22] Filed: Dec. 17, 1992

[30] Foreign Application Priority Data

Dec. 17, 1991 [SE] Sweden ................. 9103724

[51] Int. Cl.⁶ .................. B23C 5/08; B23C 5/22
[52] U.S. Cl. ...................... 407/46; 407/48; 407/49
[58] Field of Search ............ 407/33, 46, 48, 49, 407/51, 101, 108, 67, 107, 109

[56] References Cited

U.S. PATENT DOCUMENTS

| | | | |
|---|---|---|---|
| 3,408,722 | 11/1968 | Berry, Jr. | 407/49 |
| 3,467,416 | 9/1969 | Gourley | 407/49 |
| 3,551,979 | 1/1971 | Berry, Jr. | 407/49 |
| 3,578,742 | 5/1971 | Manthei | 407/101 |
| 3,757,397 | 9/1973 | Lindsay | 407/46 |
| 4,151,869 | 5/1979 | Halloran et al. | 407/46 |
| 4,879,930 | 11/1989 | Von Haas | 407/101 |
| 5,133,394 | 7/1992 | Landtwing | 407/107 |
| 5,163,490 | 11/1992 | Meis | 407/49 |

FOREIGN PATENT DOCUMENTS

| | | |
|---|---|---|
| 1102526 | 3/1961 | Germany. |
| 1255944 | 12/1971 | United Kingdom ........... 407/49 |
| 891231 | 12/1981 | U.S.S.R. ........... 407/107 |

Primary Examiner—William E. Terrell
Attorney, Agent, or Firm—Burns, Doane, Swecker & Mathis

[57] ABSTRACT

A milling cutter includes a rotary body and a plurality of recesses spaced around its outer periphery for receiving insert-carrying cartridges. Each cartridge is wedge-shaped and is retained in place by a clamping wedge which is fastened in the respective recess by a clamp screw. Each cartridge has serrations on its rear surface which engage corresponding serrations on the rearward wall of the recess. A locating pin extends between a wall of the recess and a surface of the cartridge. The cartridge carries a spring which is compressed by the clamping wedge such that the spring biases the cartridge against the rearward wall of the recess.

22 Claims, 3 Drawing Sheets

MILLING CUTTER HAVING INSERT-CARRYING CARTRIDGES

BACKGROUND OF THE INVENTION

The present invention relates to a milling cutter, preferably in the form of a rotary slotting cutter, with mechanically clamped cutting elements whereby each cutting insert is carried by a cartridge received in a recess of the milling cutter body.

Milling cutters equipped with a number of cutting inserts received in corresponding recesses in the milling cutter are previously known, for instance, from German Patent 11 02 526. The cutting inserts are mechanically clamped by means of screws or wedges having serrations. With such a tool it is possible to achieve good stability and regrinding but it is not possible to achieve desired precision location of the insert when exchanging inserts and, furthermore, the manufacture of such a tool becomes expensive.

It is an object of the present invention to provide a milling cutter with cartridges wherein the clamping means for the cartridge is not exposed to unfavorable and varying bending moments.

It is another object of the invention to firmly fix and stabilize both the axial and radial positions of the cutting insert.

A further object of the invention is to provide a milling cutter with a maximum of stability and adjustability by using a novel cartridge which provides different assembly variants in an advantageous way for rotary slotting cutters.

A still further object of the invention is to provide a milling cutter with clamping means of such design and with such location that the discharge of chips is not negatively influenced.

SUMMARY OF THE INVENTION

The present invention relates to a rotary milling cutter which comprises a generally disk-shaped cutter body defining a longitudinal rotary axis. The body includes an outer periphery having a plurality of circumferentially spaced, radially outwardly open recesses. Each recess has a forward wall and opposing rearward wall disposed rearwardly thereof with reference to a direction of rotation of the body during a milling operation. The rearward wall includes a series of serrations extending generally parallel to the longitudinal axis. Cartridges are disposed in respective recesses. Each cartridge includes a seat for a cutting insert, and front and rear support surfaces. The rear support surface includes serrations which are engaged with the serrations of the rearward wall. The front surface is inclined with respect to the rear surface to define therewith a wedge-shaped cartridge portion of radially inwardly decreasing cross-section. Clamping wedges are disposed in respective recesses for wedgingly clamping respective cartridges. Each clamping wedge engages the forward wall of its respective recess and the front surface of its respective cartridge. Clamp screws extend through respective clamping wedges and are threadingly received in the body for holding the clamping wedges in clamping engagement with the cartridges.

Preferably, a locating pin extends between a bottom surface of the cartridge and a bottom wall of the recess for locating the cartridge with respect to the recess. The pin may be received in an enlarged bore formed in the bottom wall so as to provide a certain degree of play of the cartridge.

A spring is preferably disposed in the cartridge and is arranged to be compressed by the clamping wedge such that the spring biases the cartridge against the rearward wall of the recess.

The bottom wall of the recess preferably includes first and second wall portions forming an obtuse angle therebetween. The cartridge has a bottom surface including first and second surface portions which face the first and second wall portions, respectively. The first and second surface portions form an obtuse angle therebetween which corresponds substantially to the obtuse angle formed between the first and second wall portions. The first wall portion is spaced circumferentially ahead of the second wall portion, and the first surface portion is spaced circumferentially ahead of the second surface portion.

The cutter body preferably includes a central bore. A longitudinal axis of each clamp screw intersects a wall of the bore at a reference point and forms an angle of about 10–20 degrees with a radius of the body that intersects that reference point.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
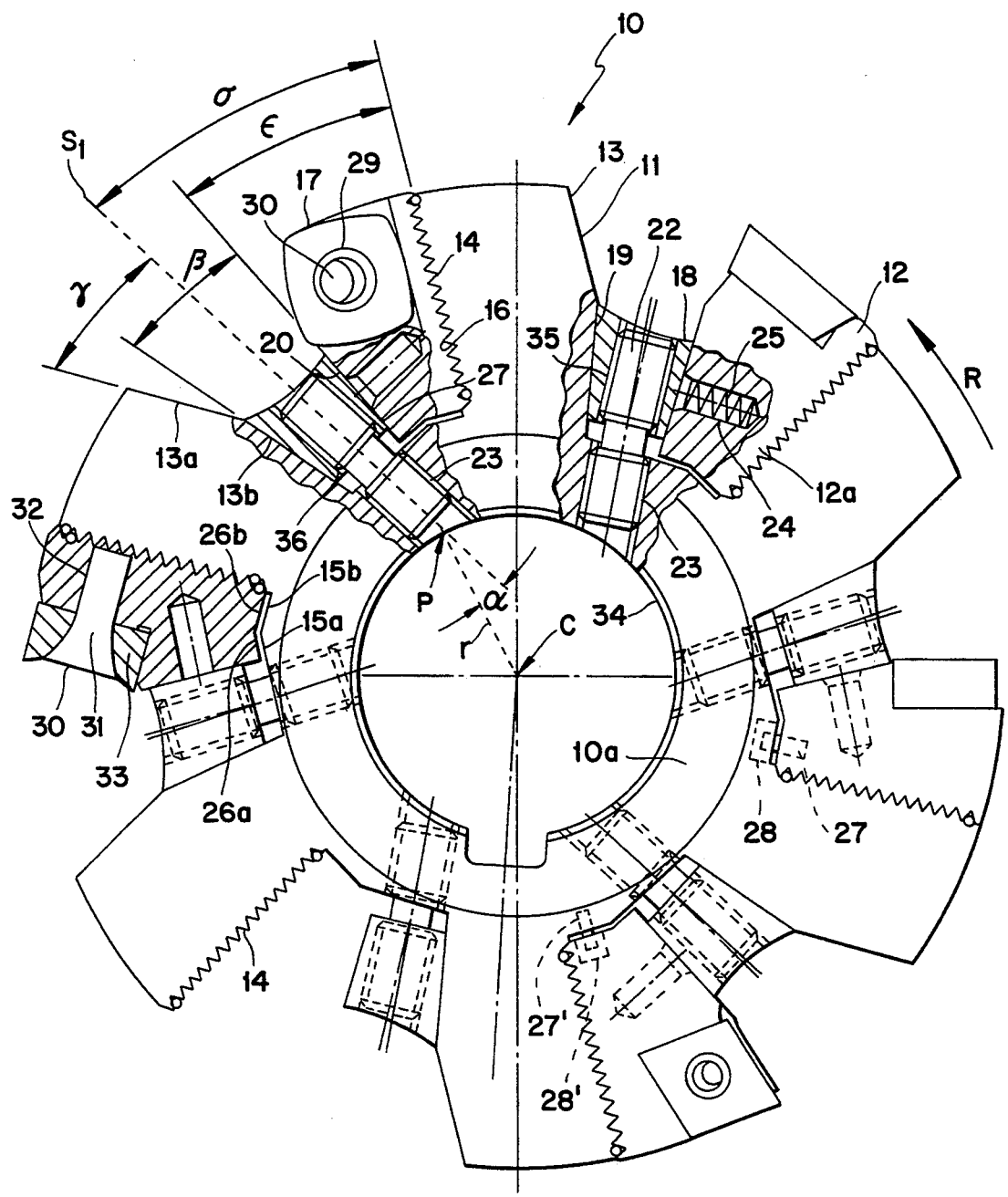
FIG. 1 is a side view of a slotting milling cutter according to one embodiment of the invention in which a series of insert equipped cartridges is mounted in the milling cutter body while one of the cartridges has been removed.

In the drawings, a cutter body of a rotary slotting milling cutter is denoted by numeral 10. The cutter body has a central core portion 10a and a plurality of circumferentially spaced, radially outwardly open recesses 11 located in the outer periphery of the body and in close proximity to the core portion 10 for the receipt of insert-equipped and partially wedge-shaped cartridges 12. The width of each cartridge 12 (i.e., the dimension parallel to a central axis of rotation of the body) could be identical with the entire width of the milling cutter body or of a portion thereof.

A radially inner wedge-shaped portion of the cartridge is denoted by numeral 12a. The milling cutter body is arranged for rotation around the central axis in direction R. The recesses 11 are evenly distributed along the periphery of the cutter body 10, in this case six recesses are provided. It is to be understood, however, that recesses 11 in certain cases might be unevenly distributed around the periphery of the milling cutter body. A forwardly located wall 13 of each recess 11, as seen in the rotary direction R, comprises two surfaces 13a and 13b arranged at an angle to each other, whereas a rearward wall 14 of the recess has a generally straight, albeit serrated, contour. The bottom of the recess is confined by a bottom wall comprised of two surfaces 15a and 15b arranged at an angle to each other which extend between the walls 13 and 14. The rearward wall 14 of the recess 11 is provided with serrations intended to engage with corresponding serrations 16 provided in a rear surface of the cartridge 12. These serrations are straight and extend along the entire width of the cutter body 10 generally parallel to the axis of rotation and enable the cartridge 2 to be pushed into place in the axial direction from either side of the cutter body. The forward bottom portion 15a of the recess 11 is arranged at an angle of 90° to 100° with respect to the wall portion 13b, whereas the rear portion 15b of the bottom is oriented at an angle of 90° to the rear wall 14 in the same recess.

A clamping means for the cartridge 12 is in the form of a clamping wedge 18 arranged radially inside of an insert 17 seated on the cartridge 12. A forward wedge surface 19 of the wedge 18 (with reference to the rotary direction), is arranged in abutment with forward wall portion 13b of recess 11, whereas a rear wedge surface 20 of the wedge is arranged in abutment with a front surface 21 of the cartridge 12. The wedge 18 is displaced along the surfaces 13b and 21 upon tightening a clamp screw 22 that is threadably engaged in a corresponding threaded bore 23 in the recess 11, the bore 23 extending all the way through the core portion 10a of the cutter. The clamp screw is provided with right hand and left hand threads so that the clamp wedge 18 can be positively displaced in both the clamping and unclamping directions. There is provided an axial bore 24 in the cartridge 12 which extends into the surface 21 and which receives a helical spring 25. This helical spring 25 is positioned to push the cartridge 12 rearwards so that the serrations 16 of the cartridge come into engagement with corresponding serrations of the surface 14. Loosening of the cartridge 12 is accomplished by an unscrewing of the clamp screw 22.

The bottom surface of the cartridge 12 is shaped as an angular broken surface comprised of surface portions 26a and 26b which correspond with the angular broken surface portions 15a and 15b of the recess 11. When the cartridge is installed, the surface portions 15a, 15b will be spaced radially from the surfaces 26a, 26b to form a gap therebetween. In order to achieve proper mounting of the cartridge 12 in its recess, the cartridge is provided with a radially oriented cylindrical locating pin 27 which is received in a bore 28 formed in the cutter body. This locating pin 27 should be oriented parallel with the plane of the surface 14. The bore has a larger diameter than the pin to provide for play of the cartridge for enabling the cartridge to be inserted in a manner producing engagement between the serrations on the cartridge and rear wall.

The radially outer portion of the cartridge 12 should, in a conventional manner, be provided with a seat for the location of the cutting insert 17. The insert 17 is in this case provided with a central aperture 29 for the receipt of the conical head 31 of a centrally provided clamp screw 30 which is threadably engaged in a correspondingly threaded bore 32 in the cartridge 12. The central aperture 29 of the insert has a decreasing cross-section towards the bottom surface 33.

The cartridges 12 could, at different positions around the milling cutter body, be provided with inserts 17 located in different orientations such as shown in FIG. 1. One common feature of all these cartridges is that the insert has a central aperture for the receipt of a clamping screw 30 engaging therein. The wedge-formed portion 12a of the cartridge shall be provided with a wedge angle $\epsilon$ in the range of 10° to 35°, preferably 20°-30°.

The center axis $S_1$ of the clamp screw 22 is not radially oriented in relation to the center C of the milling cutter. More specifically, the wedge surface 20 of the cartridge forms an acute angle with axis $S_1$ and forms an acute angle $\alpha$ with a radius r. That radius r intersects axis $S_1$ at a point where line $S_1$ intersects a point P on the inner periphery of the central hole 34 of the milling cutter. This angle $\alpha$ is in the range of 10° to 25°.

Figure 3:
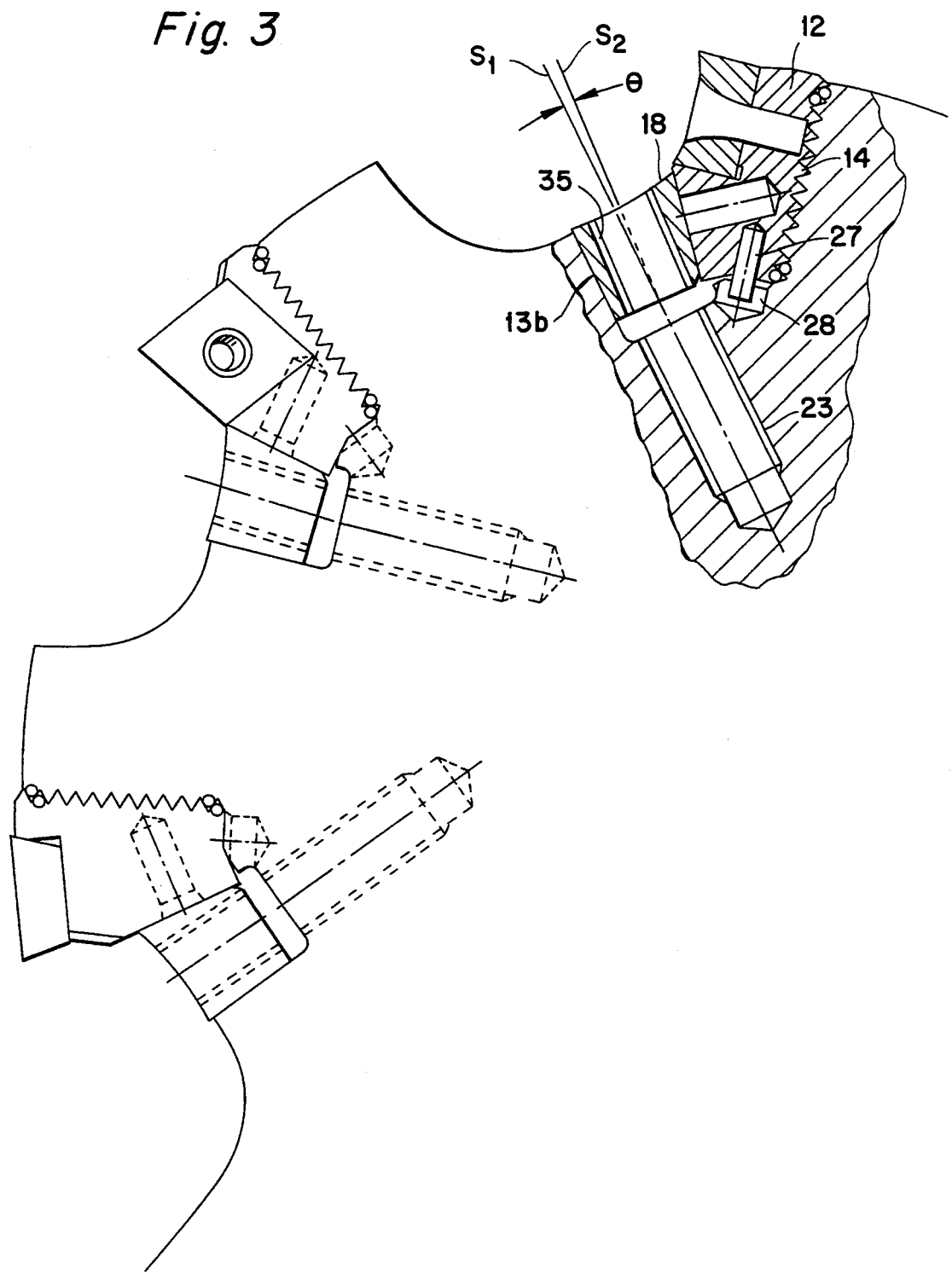
FIG. 3 is a partial side view of a slotting cutter according to yet another embodiment of the invention.

The center axis $S_1$ should be oriented substantially perpendicularly to the surface portion 15a such that the axis $S_1$ bisects an angle $\beta$ formed by surfaces 21 and wall portion 13b. In order to achieve as efficient a locking effect as possible when tightening the wedge 18, the center axis $S_2$ of the threaded bore 35 of the wedge 18 should form an angle $\Theta$ with the center axis $S_1$ of the clamp screw 22 as illustrated in FIG. 3. This angular deviation of the axis $S_2$ could be positive or negative in relation to the center line $S_1$. The angular range of $\Theta$ should be in the range of 1°-5°. The axis $S_1$ forms an angle $\gamma$ with the surface 13a, which angle is larger than the angle formed between axis $S_1$ and the radially innermost wall portion 13b. In the embodiment shown in FIG. 3 the center axis $S_2$ of the bore 35 of the wedge 18 forms a positive angle $\Theta$ with center axis $S_1$ of the screw 22. The center axis $S_1$ forms a relatively large angle $\gamma$ with the wall portion 13a, which angle is larger than the angle formed between line $S_1$ and the radially innermost wall portion 13b. In the embodiment shown in FIG. 3, the center axis $S_2$ of the bore 35 of the wedge 18 forms a positive angle $\Theta$ with the center axis $S_1$ of the screw 22. The center axis $S_1$ forms a rather large angle $\sigma$ with the rear support wall 14 of the recess 11.

Figure 2:
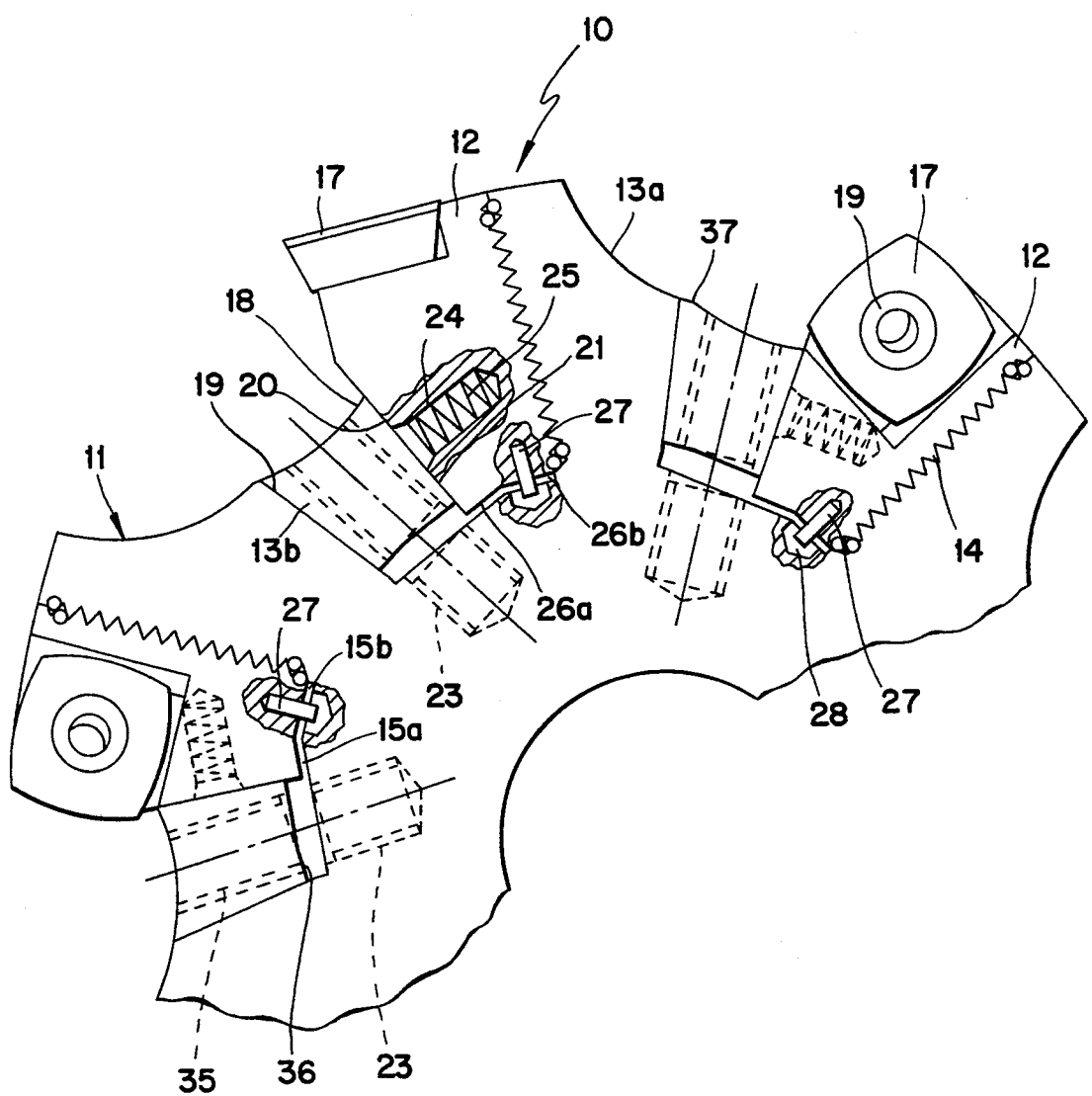
FIG. 2 is a partial side view of a slotting cutter according to another embodiment of the invention.

In the embodiment shown in FIG. 2 a rotary slotting cutter is equipped with insert-carrying cartridges clamped into recesses 11 around the circumference of the milling cutter principally as shown in FIG. 1. In this case the milling cutter body does not have a central core portion of the same type as in FIG. 1. The bores 23 for receiving the screws 22 do not extend all the way to the central hole 34 of the cutter body 10 since they terminate at a certain distance therefrom. In order to provide for improved, more favorable discharge of chips, the outer wall portion 13a of the recess 11 has been given a concave contour. At the same time also the upper surface 37 of the wedge 18 could have a similar concave form. Normally the concave surface of the upper surface 37 is provided with a radius of curvature larger than the radius of curvature of the outer wall 13a.

In the same manner shown in FIG. 1, the bottom surface of the cartridge has an angularly broken form composed of surface portions 26a and 26b, the surface portions having an angularly broken contour corresponding to the contour of wall portions 15a and 15b. This arrangement will, when combined with the arrangement of locating pin 27 and helical spring 25, provide for a stable mounting of the cartridge and a stable engagement between the serrations 16 of the cartridge and the serrations of the rear wall 14 of the recess 11.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A rotary milling cutter comprising:

a generally disk-shaped cutter body defining a longitudinal rotary axis, said body including an outer periphery having a plurality of circumferentially spaced, radially outwardly open recesses, each recess having a forward wall and an opposing rearward wall disposed rearwardly thereof with reference to a direction of rotation of said body during a milling operation, said rearward wall including a series of serrations extending generally parallel to said longitudinal axis, cartridges disposed in respective recesses, each cartridge including a seat for a cutting insert, and front and rear support surfaces, said rear support surface including serrations engaged with said serrations of said rearward wall, said front surface being convergent with respect to said rear surface in a radially inward direction to define therewith a wedge-shaped cartridge portion having a wedge angle of about 10–35 degrees, clamping wedges disposed in respective recesses for wedgingly clamping respective cartridges, each clamping wedge engaging said forward wall of its respective recess and said front surface of its respective cartridge, and clamp screws extending through respective clamping wedges and being threadingly received in said body for holding said clamping wedges in clamping engagement with said cartridges.

2. A rotary milling cutter comprising:

a generally disk-shaped cutter body defining a longitudinal rotary axis, said body including an outer periphery having a plurality of circumferentially spaced, radially outwardly open recesses, each recess having a forward wall and an opposing rearward wall disposed rearwardly thereof with reference to a direction of rotation of said body during a milling operation, said rearward wall including a series of serrations extending generally parallel to said longitudinal axis, cartridges disposed in respective recesses, each cartridge including a seat for a cutting insert, and front and rear support surfaces, said rear support surface including serrations engaged with said serrations of said rearward wall, said front surface being convergent with respect to said rear surface in a radially inward direction to define therewith a wedge-shaped cartridge portion, clamping wedges disposed in respective recesses for wedgingly clamping respective cartridges, each clamping wedge engaging said forward wall of its respective recess and said front surface of its respective cartridge, clamp screws extending through respective clamping wedges and being threadingly received in said body for holding said clamping wedges in clamping engagement with said cartridges, and a spring disposed in each cartridge and arranged to be compressed by a respective clamping wedge such that said spring biases said cartridge against said rearward wall.

3. A rotary milling cutter comprising:

a generally disk-shaped cutter body defining a longitudinal rotary axis, said body including an outer periphery having a plurality of circumferentially spaced, radially outwardly open recesses, each recess having a forward wall and an opposing rearward wall disposed rearwardly thereof with reference to a direction of rotation of said body during a milling operation, said rearward wall including a series of serrations extending generally parallel to said longitudinal axis, cartridges disposed in respective recesses, each cartridge including a seat for a cutting insert, and front and rear support surfaces, said rear support surface including serrations engaged with said serrations of said rearward wall, said front surface being convergent with respect to said rear surface in a radially inward direction to define therewith a wedge-shaped cartridge portion, clamping wedges disposed in respective recesses for wedgingly clamping respective cartridges, each clamping wedge engaging said forward wall of its respective recess and said front surface of its respective cartridge, and clamp screws extending through respective clamping wedges and being threadingly received in said body for holding said clamping wedges in clamping engagement with said cartridges, said body including threaded bores for receiving respective clamp screws, each clamping wedge including a threaded bore for receiving a clamp screw, a longitudinal axis of each threaded bore of said body forming an angle of about 1–5 degrees with a longitudinal axis of said threaded bore of its respective clamping wedge when said clamping wedge is attached to said body by its respective clamp screw.

4. A rotary milling cutter comprising:

a generally disk-shaped cutter body defining a longitudinal rotary axis, said body including an outer periphery having a plurality of circumferentially spaced, radially outwardly open recesses, each recess having a forward wall and an opposing rearward wall disposed rearwardly thereof with reference to a direction of rotation of said body during a milling operation, said rearward wall including a series of serrations extending generally parallel to said longitudinal axis, each recess including a bottom wall located at a radially inner end of said recess, cartridges disposed in respective recesses, each cartridge including a seat for a cutting insert, and front and rear support surfaces, said rear support surface including serrations engaged with said serrations of said rearward wall, said front surface being convergent with respect to said rear surface in a radially inward direction to define therewith a wedge-shaped cartridge portion, each cartridge including a bottom surface facing said bottom wall of its respective recess, clamping wedges disposed in respective recesses for wedgingly clamping respective cartridges, each clamping wedge engaging said forward wall of its respective recess and said front surface of its respective cartridge, clamp screws extending through respective clamping wedges and being threadingly received in said body for holding said clamping wedges in clamping engagement with said cartridges, and locating pins extending between said body and respective cartridges, each locating pin extending between said bottom wall of its respective recess and said bottom surface of its respective cartridge.

5. A milling cutter according to claim 4, wherein said body includes a central bore, a longitudinal axis of each clamp screw intersecting a wall of said bore at a reference point and forming an angle of about 10–25 degrees with a radius of said body intersecting said reference point.

6. A rotary milling cutter comprising:
a generally disk-shaped cutter body defining a longitudinal rotary axis, said body including an outer periphery having a plurality of circumferentially spaced, radially outwardly open recesses, each recess having a forward wall and an opposing rearward wall disposed rearwardly thereof with reference to a direction of rotation of said body during a milling operation, said rearward wall including a series of serrations extending generally parallel to said longitudinal axis, said body including a central bore,
cartridges disposed in respective recesses, each cartridge including a seat for a cutting insert, and front and rear support surfaces, said rear support surface including serrations engaged with said serrations of said rearward wall, said front surface being convergent with respect to said rear surface in a radially inward direction to define therewith a wedge-shaped cartridge portion,
clamping wedges disposed in respective recesses for wedgingly clamping respective cartridges, each clamping wedge engaging said forward wall of its respective recess and said front surface of its respective cartridge, and
clamp screws extending through respective clamping wedges and being threadingly received in said body for holding said clamping wedges in clamping engagement with said cartridges, a longitudinal axis of each clamp screw intersecting a wall of said bore at a reference point and forming an angle of about 10–25 degrees with a radius of said body intersecting said reference point.

7. A milling cutter according to claim 6 including a locating pin extending between said body and each cartridge.

8. A milling cutter according to claim 7, wherein opposite ends of said locating pin extend into a wall of said recess and a surface of said cartridge, respectively.

9. A milling cutter according to claim 7, wherein each recess includes a bottom wall located at a radially inner end of said recess, each cartridge including a bottom surface facing said bottom wall of its respective recess, each locating pin extending between said bottom wall of its respective recess and said bottom surface of its respective cartridge.

10. A milling cutter according to claim 9, wherein each pin is oriented substantially parallel to a plane of said rearward wall of its respective recess.

11. A milling cutter according to claim 9 wherein an engagement between said locating pin and one of said body and cartridge provides for play in a direction parallel to said axis of rotary.

12. A milling cutter according to claim 11, wherein said locating pins are carried by their respective cartridges and received in bores of their respective bottom walls, said bores having a larger cross-section than said pins to provide said play.

13. A milling cutter according to claim 6, wherein each recess includes a bottom wall located at a radially inner end thereof, said bottom wall including first and second wall portions forming an obtuse angle therebetween, each cartridge having a bottom surface, said bottom surface including first and second surface portions, facing said first and second wall portions, respectively, said first and second surface portions forming an obtuse angle therebetween which corresponds substantially to said obtuse angle formed between said first and second wall portions.

14. A milling cutter according to claim 6, wherein said forward wall of said recess engaged by said clamping wedge forms an angle with said front surface of said cartridge, said angle being bisected by a longitudinal axis of said clamp screw located in said recess.

15. A milling cutter according to claim 6, wherein said body includes threaded bores for receiving respective clamp screws, each clamping wedge including a threaded bore for receiving a clamp screw, a longitudinal axis of each threaded bore of said body forming an angle of about 1–5 degrees with a longitudinal axis of said threaded bore of its respective clamping wedge when said clamping wedge is attached to said body by its respective clamp screw.

16. A milling cutter according to claim 6, wherein a longitudinal axis of each clamp screw forms an angle of about 25–45 degrees with said rearward wall of its respective recess.

17. A milling cutter according to claim 16, wherein said angle is about 30–40 degrees.

18. A milling cutter according to claim 6, wherein said convergent front and rear surfaces of each cartridge form a wedge angle therebetween of about 10–35 degrees.

19. A milling cutter according to claim 18, wherein said wedge angle is about 20–30 degrees.

20. A milling cutter according to claim 6 including a spring disposed in said cartridge and arranged to be compressed by said clamping wedge such that said spring biases said cartridge against said rearward wall.

21. A milling cutter according to claim 20, wherein each recess includes a bottom wall located at a radially inner end thereof, each cartridge including a bottom surface facing said bottom wall of its respective recess, a locating pin extending between said bottom wall of its respective recess and said bottom surface of its respective cartridge.

22. A milling cutter according to claim 21, wherein each recess includes a bottom wall located at a radially inner end thereof, said bottom wall including first and second wall portions forming an obtuse angle therebetween, each cartridge having a bottom surface, said bottom surface including first and second surface portions, facing said first and second wall portions, respectively, said first and second surface portions forming an obtuse angle therebetween which corresponds substantially to said obtuse angle formed between said first and said wall portions.

* * * * *